(12) United States Patent
Tanaka et al.

(10) Patent No.: US 11,999,569 B2
(45) Date of Patent: Jun. 4, 2024

(54) OBJECT TO BE TRANSPORTED AND AUTOMATIC GUIDED TRANSPORTATION SYSTEM

(71) Applicant: KABUSHIKI KAISHA TOSHIBA, Tokyo (JP)

(72) Inventors: Junya Tanaka, Tokyo (JP); Hideki Ogawa, Tokyo (JP); Daisuke Yamamoto, Kawasaki Kanagawa (JP); Takafumi Sonoura, Yokohama Kanagawa (JP); Seiji Tokura, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 906 days.

(21) Appl. No.: 17/004,077

(22) Filed: Aug. 27, 2020

(65) Prior Publication Data
US 2021/0292088 A1    Sep. 23, 2021

(30) Foreign Application Priority Data

Mar. 18, 2020   (JP) ................................ 2020-047665

(51) Int. Cl.
*B65G 1/06* (2006.01)
*B25J 5/00* (2006.01)
(Continued)

(52) U.S. Cl.
CPC .............. *B65G 1/065* (2013.01); *B25J 5/00* (2013.01); *B25J 9/1697* (2013.01); *B25J 11/008* (2013.01);
(Continued)

(58) Field of Classification Search
CPC .......... B25J 11/008; B25J 5/00; B25J 9/1697; B60P 1/025; B60P 1/6409; B60P 1/6445; B60P 7/13; B60P 7/132; B62B 2202/90; B62B 2203/28; B62B 2203/29; B62B 3/004; B62B 3/005; B62B 3/0612; B62B 3/108; B62B 5/0009; B62B 5/0069; B65D 2519/00796; B65D 88/12; B65D 2590/0033; B65D 2590/0013; B65D 2590/002; B65G 1/0414; B65G 1/0485;
(Continued)

(56) References Cited

U.S. PATENT DOCUMENTS 9,352,745 B1 *   5/2016   Theobald ............. G05D 1/0088
2007/0297879 A1 * 12/2007 Yuyama ................ B62B 5/0083
                                                          280/79

(Continued)

FOREIGN PATENT DOCUMENTS

JP   2015-535373 A   12/2015
JP   2016-140556 A    8/2016

*Primary Examiner* — Glenn F Myers
(74) *Attorney, Agent, or Firm* — Finnegan, Henderson, Farabow, Garrett & Dunner, LLP

(57) ABSTRACT

According to one embodiment, an object to be transported by an automatic guided transportation vehicle includes: a housing having an entry route through which the automatic guided transportation vehicle enters; a marker that can be recognized by a sensor provided in the automatic guided transportation vehicle; and a marker holder configured to hold the marker retractably at an initial position where the marker contacts with the automatic guided transportation vehicle in the entry route.

12 Claims, 9 Drawing Sheets

(51) Int. Cl.
*B25J 9/16* (2006.01)
*B25J 11/00* (2006.01)

(52) U.S. Cl.
CPC .............. *B65G 2203/0216* (2013.01); *B65G 2203/041* (2013.01)

(58) Field of Classification Search
CPC .............. B65G 1/0492; B65G 1/065; B65G 2203/0216; B65G 2203/0283; B65G 2203/04; B65G 2203/041; B65G 2203/042; B65G 2203/044; B65G 2203/047; B65G 2207/40; G05B 19/41895; G05B 2219/50393; Y02P 90/02; Y02P 90/60
USPC ........................................................ 414/279
See application file for complete search history.

(56) References Cited

U.S. PATENT DOCUMENTS

2014/0100693 A1    4/2014  Fong et al.
2016/0236869 A1*   8/2016  Kimura ............... B65G 1/1378
2020/0324976 A1*  10/2020  Diehr .................... B65G 1/02

* cited by examiner

OBJECT TO BE TRANSPORTED AND AUTOMATIC GUIDED TRANSPORTATION SYSTEM

CROSS-REFERENCE TO RELATED APPLICATION

This application is based upon and claims the benefit of priority from Japanese Patent Application No. 2020-047665, filed Mar. 18, 2020; the entire contents of (all of) which are incorporated herein by reference.

FIELD

Embodiments described herein relate generally to an object to be transported and an automatic guided transportation system.

BACKGROUND

In the field of logistics, there is demand for labor saving due to labor shortage and cost reduction. For example, as one of the methods for automating the transportation of an object to be transported such as a carriage, an automatic guided transportation system for transporting the object to be transported by an automatic guided transportation vehicle has been proposed. Such an automatic guided transportation system is expected to further improve the docking operation between the object to be transported and the automatic guided transportation vehicle.

An embodiment of the present invention provides an object to be transported and an automatic guided transportation system capable of improving the docking operation between the object to be transported and the automatic guided transportation vehicle.

DETAILED DESCRIPTION

According to one embodiment, an object to be transported by an automatic guided transportation vehicle includes: a housing having an entry route through which the automatic guided transportation vehicle enters; a marker that can be recognized by a sensor provided in the automatic guided transportation vehicle; and a marker holder configured to hold the marker retractably at an initial position where the marker contacts with the automatic guided transportation vehicle in the entry route.

Various Embodiments will be described hereinafter with reference to the accompanying drawings.

Hereinafter, an object to be transported and an automatic guided transportation system according to an embodiment will be described with reference to the drawings.

In the present application, the X direction, Y direction and Z direction of the rectangular coordinate system are defined as follows. The Z direction is the vertical direction and the +Z direction is the upward direction. The X direction is the horizontal direction, which is the front-back direction of the automatic guided transportation vehicle, and the +X direction is the front direction of the automatic guided transportation vehicle. The Y direction is a horizontal direction, a direction orthogonal to the X direction and a left-right direction (width direction) of the automatic guided transportation vehicle. In the present application, the term "horizontal plane direction" includes not only the X direction and the Y direction but also the circumferential direction around the Z axis.

First Embodiment

Figure 1:
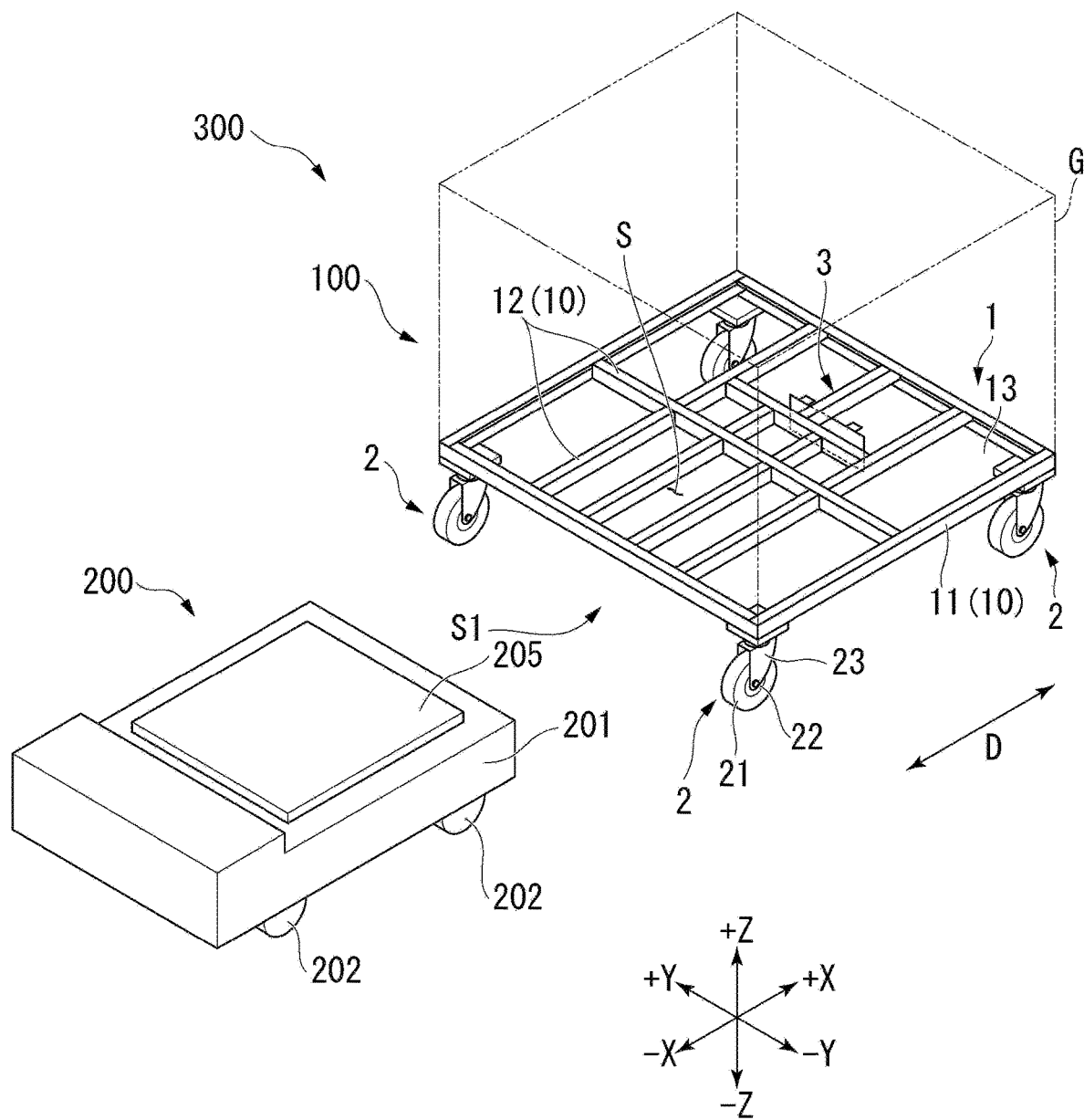
FIG. 1 is a perspective view of an automatic guided transportation system according to a first embodiment.

FIG. 1 is a perspective view of an automatic guided transportation system 300 according to the first embodiment.

The automatic guided transportation vehicle system 300 includes a carriage 100 and an automatic guided transportation vehicle 200. The carriage 100 is an example of an object to be transported by the automatic guided transportation vehicle 200.

Figure 2:
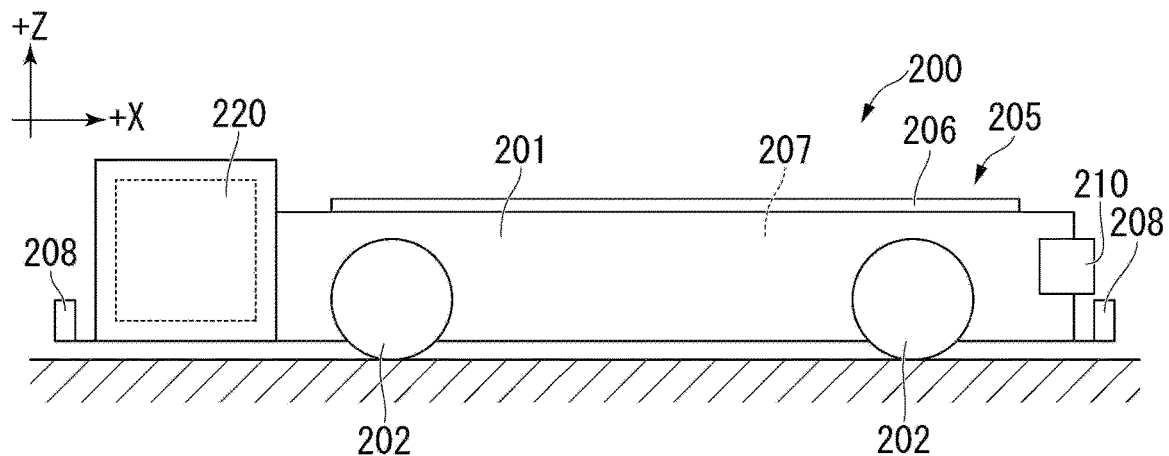
FIG. 2 is a side view of an automatic guided transportation vehicle of the automatic guided transportation system.

FIG. 2 is a side view of the automatic guided transportation vehicle 200.

The automatic guided transportation vehicle 200 is, for example, an autonomous mobile vehicle that does not require operator control and is also a lineless type autonomous mobile vehicle that does not require lines drawn on the floor. The automatic guided transportation vehicle 200 is, for example, a low-floor type autonomous mobile vehicle, which crawls below the vehicle 100, is connected to the vehicle 100, and transports the vehicle 100. Here, the automatic guided transportation vehicle 200 is not limited to the above example, and may be another type of automatic guided transportation vehicle. For example, the automatic guided transportation vehicle 200 may be operated by an operator.

The automatic guided transportation vehicle 200 includes a vehicle body 201, wheels 202, a drive motor that drives the wheels 202, a lift unit 205, a bumper 208, a sensor 210, and a control device 220.

The vehicle body 201 is formed in a substantially rectangular parallelepiped box shape. The vehicle body 201 is arranged in the center of the automatic guided transportation vehicle 200 in plan view.

The wheels 202 are arranged outside the four corners of the vehicle body 201 in plan view. The wheel 202 has an axle that is parallel to the Y direction. The drive motors (not shown) are arranged inside the four corners of the vehicle body 201. The drive motor rotationally drives the plurality of wheels 202 independently of each other. An encoder that detects the amount of rotation is attached to the drive motor.

The wheels 202 form, for example, Mecanum wheels. The Mecanum wheel has a plurality of barrels on the circumference of the wheel 202. The barrel is free to rotate about a rotation axis that is inclined by 45 degrees with respect to the axle of the wheel 202. The Mecanum wheel moves the vehicle body 201 in all directions by changing the combination of the rotation directions of the four wheels 202 and the rotation speed. The four wheels 202 may be a normal two-wheel independent drive system (two drive wheels and two driven wheels) or a steered wheel system called an active caster.

The lift unit 205 is a connecting portion with the carriage 100, which is an object to be transported. The connecting portion is detachably connected (docked) to the carriage 100. "Connecting" in the present application means a broad concept of "associating two objects", including supporting the carriage 100 (for example, lifting from below), engaging the carriage 100 (for example, catching), and the like. The lift unit 205, which is a connecting portion, supports at least part of the weight of the carriage 100 that is the object to be transported. Hereinafter, supporting a part of the weight of the carriage 100 may be referred to as "semi-supporting the carriage 100".

The lift unit 205 includes a top plate 206 on which the carriage 100 is placed, and an elevating mechanism 207 that elevates and lowers the top plate 206. The top plate 206 is formed in a substantially rectangular flat plate shape in a plan view. The top plate 206 is arranged in the +Z direction of the vehicle body 201.

The elevating mechanism 207 is arranged in the −Z direction of the top plate 206. The elevating mechanism 207 includes a link mechanism and a power source (not shown) such as a motor and an actuator. The upper end of the link mechanism is connected to the top plate 206, and the lower end is connected to the vehicle body 201. The power source expands and contracts the link mechanism in the Z direction. As a result, the top plate 206 connected to the link mechanism moves up and down in the Z direction. The elevating mechanism 207 may elevate and lower the top plate 206 directly by a linear motion actuator.

The bumper 208 is a member that absorbs shock and vibration, and is formed of a material having elasticity. As shown in FIG. 2, the bumpers are attached to the front (+X direction) end and the rear (−X direction) end of the vehicle body 201.

The sensor 210 is attached to the front (+X direction) end of the vehicle body 201. The sensor 210 is a laser range sensor that measures physical shape data of space, and is, for example, a laser range finder (LRF). The laser scanning range of the sensor 210 is, for example, 270°. The sensor 210 can detect the presence of an object based on the presence or absence of reflection of the laser emitted by the LRF. The sensor 210 can detect the distance to the object based on the degree of reflection of the emitted laser. The sensor 210 outputs the relative distance and direction to the measurement target. The sensor 210 is not limited to the above example and may be another type of sensor. For example, the sensor 210 may be an ultrasonic sensor or a camera.

The control device 220 is a device that controls the wheels 202, the drive motor, the lifting mechanism 207 of the lift unit 205, and the like based on the output of the sensor 210 and the like. The control device 220 has a computer capable of executing software such as a CPU. The control function of the control device 220 is realized by software.

Figure 3:
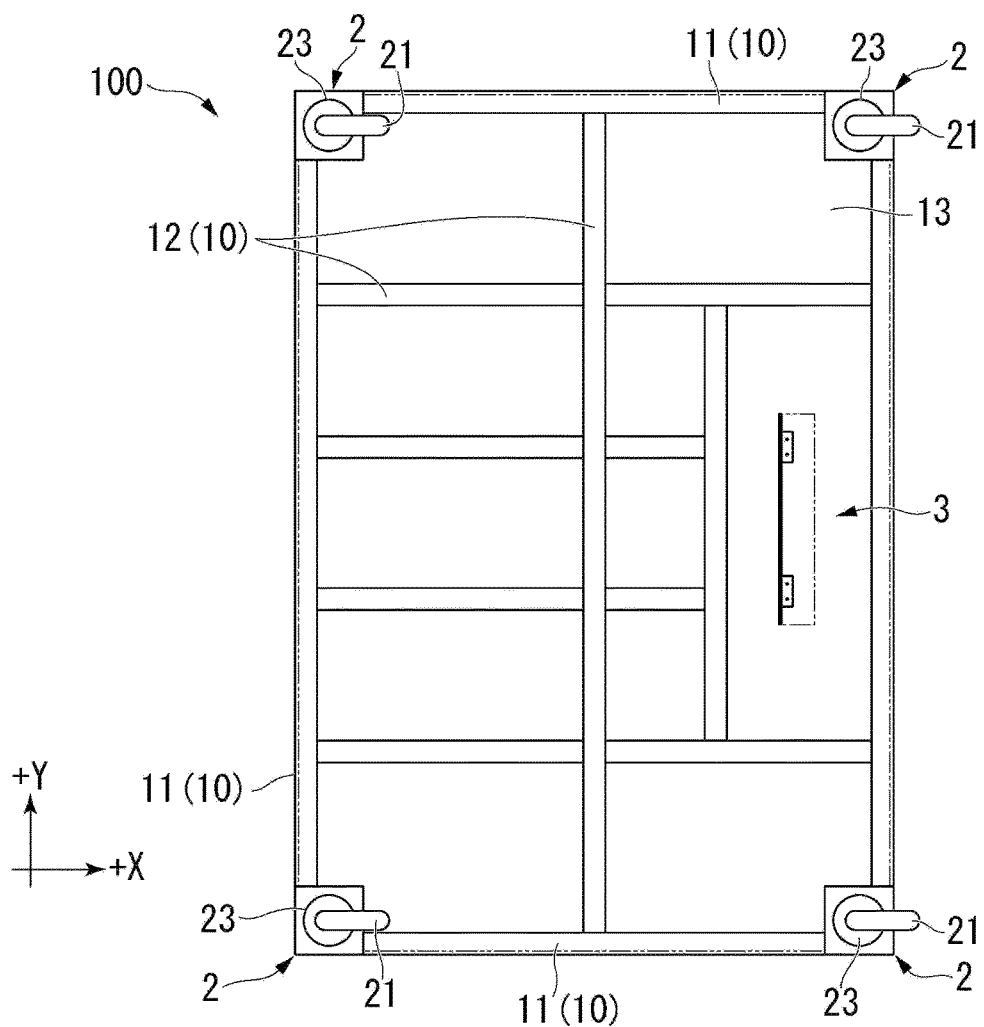
FIG. 3 is a plan view of a carriage of the automatic guided transportation system.

FIG. 3 is a plan view of the carriage 100.

The carriage 100 has a housing 1, a swivel caster 2, and a movable marker 3. As shown in FIG. 1, the carriage 100 is an object to be transported on which an object to be transported G is placed and transported.

The housing 1 has a frame 10 and a flat plate 13. The frame body 10 has an outer frame 11 having a quadrangular shape in a plan view, and a rod member 12 connected to the inside of the outer frame 11 in a beam shape. The upper surface of the frame body 10 is a mounting surface on which the object to be transported G is mounted. The flat plate 13 is a quadrangular plate material in a plan view, and the outer periphery is supported by the frame body 10. The flat plate 13 is formed of a material such as transparent plastic.

The swivel casters 2 are provided at the four corners of the housing 1. The swivel caster 2 includes wheels 21 and wheel holding portions 23. The wheel holding portion 23 is attached to the lower surface of the frame body 10 and supports the axle 22 of the wheel 21. The axle 22 is oriented in the horizontal direction. The wheel holding portion 23 can rotate the axle 22 that is oriented in the horizontal direction about a rotation axis that extends in the vertical direction.

Figure 4:
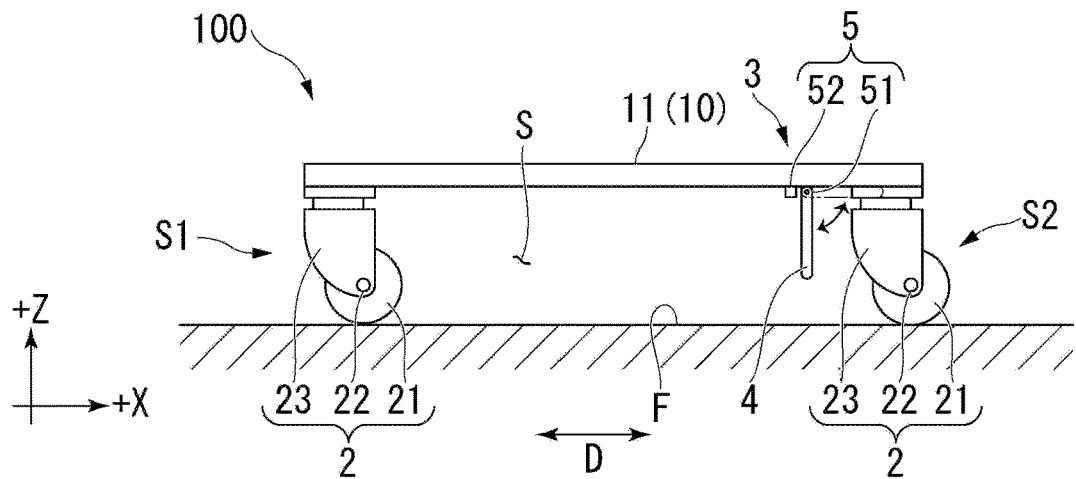
FIG. 4 is a side view of the carriage.

FIG. 4 is a side view of the carriage 100.

Between the lower surface of the frame body 10 and the floor surface F, an entry route S through which the automatic guided transportation vehicle 200 can enter along the floor surface is formed. The height of the entry route S (the length from the lower surface of the frame body 10 to the floor surface F) is larger than the vertical length of the automatic guided transportation vehicle 200. Further, the width of the entry route S (the length between the flexible casters 2) is larger than the length of the automatic guided transportation vehicle 200 in the left-right direction. The entry route S has a first opening S1 through which the automatic guided transportation vehicle 200 enters and a second opening S2 on the side opposite to the first opening S1 in the entry direction D through which the automatic guided transportation vehicle 200 enters.

The movable marker 3 is a movable marker provided on the entry route S, as shown in FIG. 4. The movable marker 3 is provided on the entry route S at a position closer to the second opening S2 than the first opening S1. The movable marker 3 includes a marker 4 and a marker holder 5 that holds the marker 4.

The marker 4 is a marker that can be recognized by the sensor 210 of the automatic guided transportation vehicle 200. The marker 4 is formed in a plate shape. The normal direction of the marker 4 substantially matches the entry direction D of the entry route S. In the present embodiment, since the sensor 210 is LRF, the marker 4 is made of a material such as plastic that can recognize LRF. In a state where the sensor 210 is recognizable, the marker 4 may be formed of a fiber such as cloth. In a state where the sensor 210 is a camera, the marker 4 may have a pattern suitable for recognition by the camera.

As shown in FIG. 4, the marker holder 5 holds the marker 4 on the entry route S. The marker holder 5 has a hinge 51 and a stopper 52.

The hinge 51 is, for example, a flat hinge, one of which is attached to the flat plate 13 of the housing 1 and the other of which is attached to the marker 4. The hinge 51 rotatably supports the marker 4 with respect to the housing 1. The lower end of the marker 4 supported by the hinge 51 rotates along the entry direction D.

The marker 4 supported by the hinge 51 is arranged at an equilibrium position where the marker 4 stops due to gravity when the automatic guided transportation vehicle 200 does not enter the entry route S. This equilibrium position is called the "initial position" of the marker 4. The marker 4 arranged at the initial position contacts the automatic guided transportation vehicle 200 that has entered the entry route S. The marker 4 supported by the hinge 51 can be retracted from the entry route S by rotating.

The stopper 52 is a member that regulates the rotation range of the marker 4, and is provided adjacent to the hinge 51. As shown in FIG. 4, the stopper 52 is provided closer to the first opening S1 side than the hinge 51. The stopper 52 restricts the lower end of the marker 4 at the initial position from rotating toward the first opening S1 side.

Figure 5:
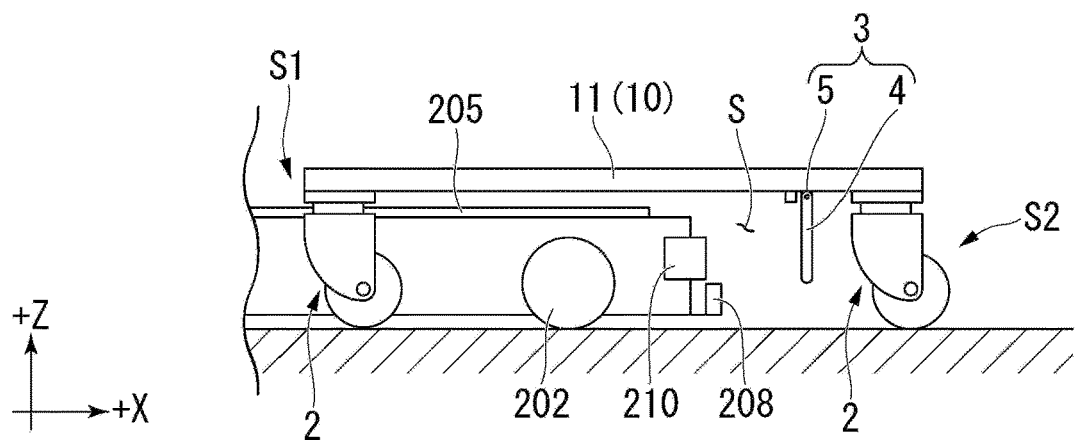
FIG. 5 is a diagram showing a docking operation between the vehicle and the automatic guided transportation vehicle.
Figure 6:
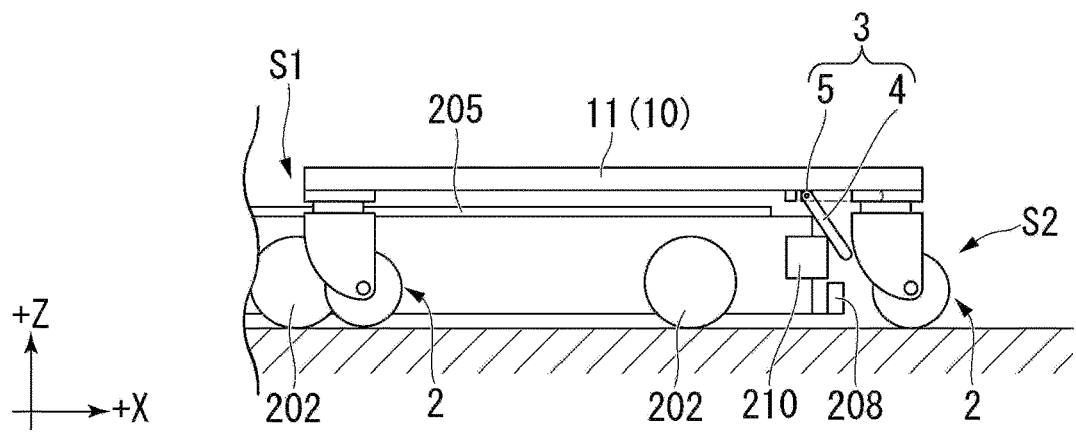
FIG. 6 is a diagram for explaining a docking operation between the carriage and the automatic guided transportation vehicle.

Next, the docking operation between the carriage 100 and the automatic guided transportation vehicle 200 will be described. FIGS. 5 and 6 are diagrams for explaining the docking operation of the carriage 100 and the automatic guided transportation vehicle 200.

As shown in FIG. 1, the control device 220 of the automatic guided transportation vehicle 200 acquires the relative distance to the marker 4 and the direction of the marker 4 from the position distant from the carriage 100 by the sensor 210. The control device 220 of the automatic guided transportation vehicle 200 controls the drive motor of the automatic guided transportation vehicle 200 to cause the automatic guided transportation vehicle 200 to enter the entry route S from the first opening S1.

The automatic guided transportation vehicle 200 enters the entry route S through the first opening S1 as shown in FIG. 5. The control device 220 of the automatic guided transportation vehicle 200 advances the automatic guided transportation vehicle 200 to the marker 4 along the entry route S based on the relative distance to the marker 4 acquired by the sensor 210 and the direction of the marker 4. The marker 4 is arranged on the entry route S. Therefore, as compared with the case where the marker 4 is not arranged on the entry route S, the sensor 210 can be brought closer to the marker 4. As a result, the control device 220 of the automatic guided transportation vehicle 200 can grasp the position of the marker 4 more accurately.

The control device 220 of the automatic guided transportation vehicle 200 pushes the marker 4 away from the automatic guided transportation vehicle 200 to further move the automatic guided transportation vehicle 200 forward. As shown in FIG. 6, the automatic guided transportation vehicle 200 contacts with the marker 4, rotates the lower end of the marker 4 toward the second opening S2 side, retracts the marker 4 from the entry route S, and moves forward. The marker 4 can be retracted from the entry route S even though it does not have an actuator or the like for driving the marker 4.

Figure 7:
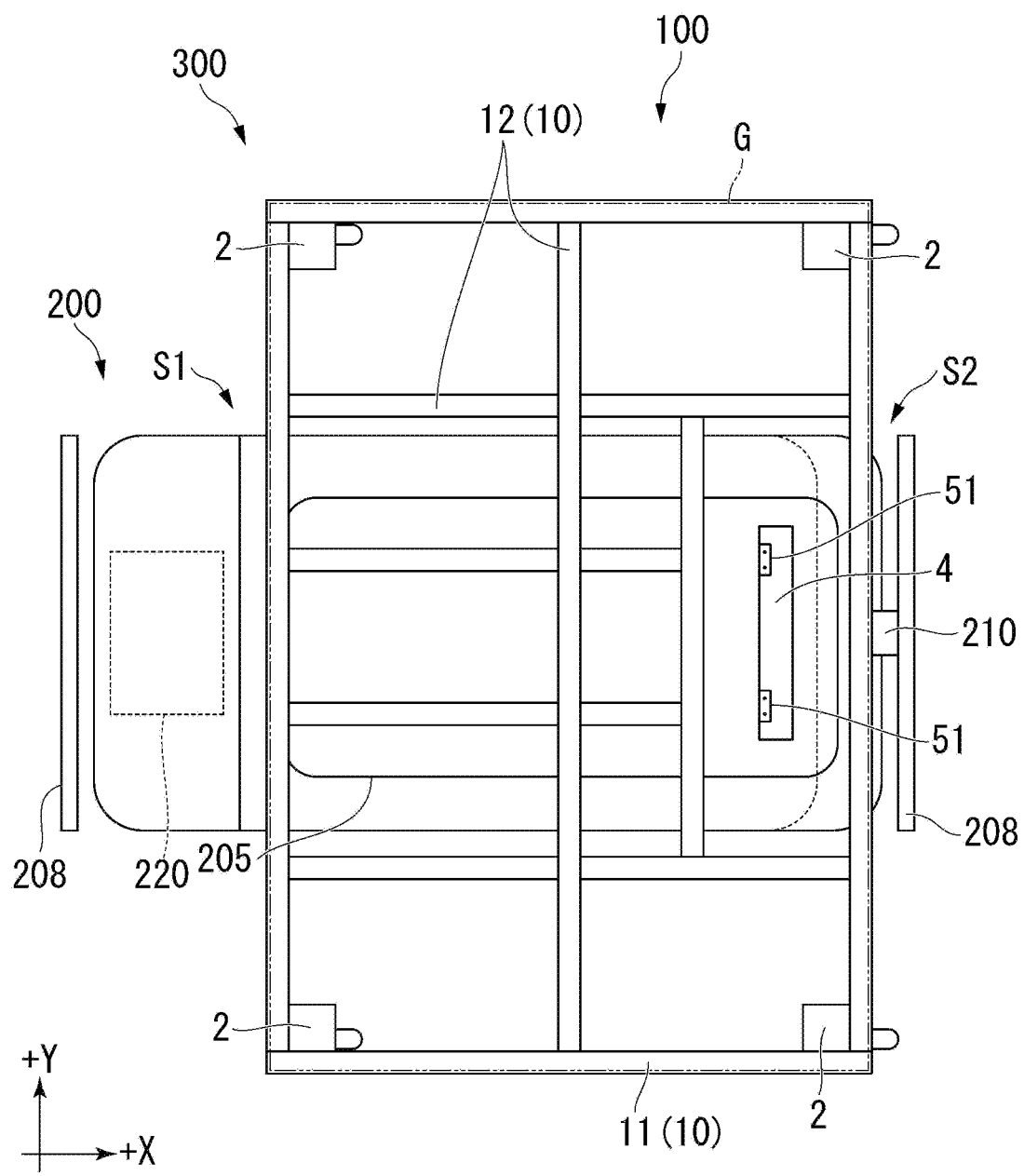
FIG. 7 is a plan view of the automatic guided transportation vehicle system after the automatic guided transportation vehicle has entered the entry route.

FIG. 7 is a plan view of the automatic guided transportation vehicle system 300 after the automatic guided transportation vehicle 200 has entered the entry route S. The dimension of the automatic guided transportation vehicle 200 in the front-rear direction is longer than the length of the entry route S of the carriage 100 (the length from the first opening S1 to the second opening S2). Therefore, the sensor 210 of the automatic guided transportation vehicle 200 that has entered the entry route S is exposed from the second opening S2, as shown in FIG. 7.

The control device 220 of the automatic guided transportation vehicle 200 drives the elevating mechanism 207 to raise the top plate 206 in the +Z direction, and brings the top plate 206 into contact with the carriage 100. The control device 220 of the automatic guided transportation vehicle 200 further raises the top plate 206 to support or semi-support the carriage 100. Due to the frictional force between the top plate 206 of the automatic guided transportation vehicle 200 and the carriage 100, relative movement of the automatic guided transportation vehicle 200 and the carriage 100 in the horizontal plane direction is suppressed. The automatic guided transportation vehicle 200 supports or semi-supports the carriage 100, so that the automatic guided transportation vehicle 200 and the carriage 100 are docked.

The marker 4 does not prevent the docking operation between the automatic guided transportation vehicle 200 and the carriage 100. The marker 4 is in contact with the lift unit 205 of the automatic guided transportation vehicle 200, the carriage 100, or the like, and does not return to the initial position.

Figure 8:
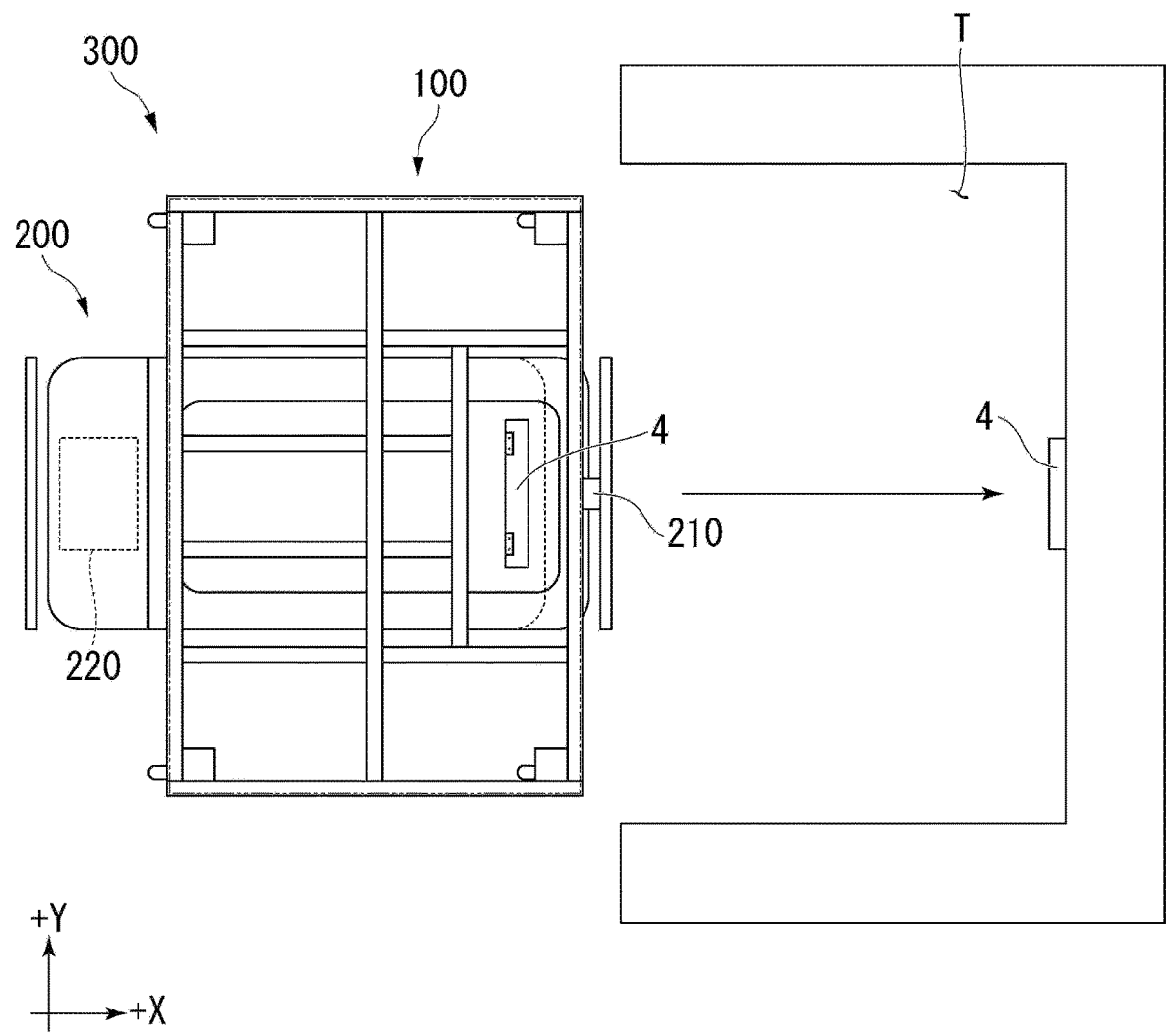
FIG. 8 is a plan view showing the automatic guided transportation vehicle that transports the carriage.
Figure 9:
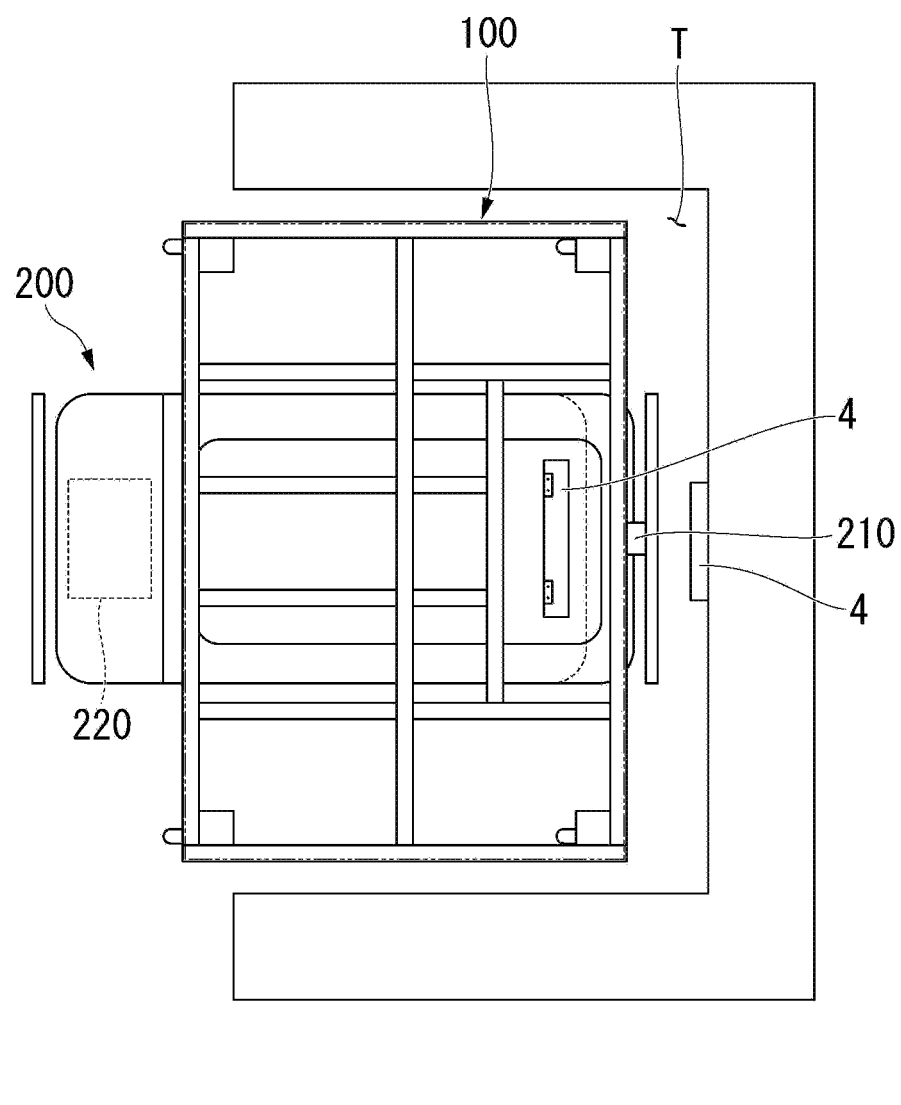
FIG. 9 is a plan view showing the automatic guided transportation vehicle that transports the carriage.

FIGS. 8 and 9 are plan views showing an automatic guided transportation vehicle 200 that transports the carriage 100.

The automatic guided transportation vehicle 200 transports the carriage 100 to the target position T as shown in FIG. 8. The sensor 210 of the automatic guided transportation vehicle 200 is exposed from the second opening S2 in a state where the carriage 100 is supported or semi-supported. Therefore, the automatic guided transportation vehicle 200 supporting or semi-supporting the carriage 100 can measure the physical shape data of the space by using the sensor 210.

Since the marker 4 is provided at the target position T, the control device 220 of the automatic guided transportation vehicle 200 acquires the relative distance to the marker 4 and the direction of the marker 4 by the sensor 210. As shown in FIG. 9, the control device 220 of the automatic guided transportation vehicle 200 controls the drive motor of the carriage 100 to carry the carriage 100 to the target position T.

After transporting the carriage 100 to the target position T, the control device 220 of the automatic guided transportation vehicle 200 drives the elevating mechanism 207 to lower the top plate 206 in the −Z direction, and separates the top plate 206 from the carriage 100. The carriage 100 is placed on the floor surface F at the target position T.

The control device 220 of the automatic guided transportation vehicle 200 retracts the automatic guided transportation vehicle 200 to cause the automatic guided transportation vehicle 200 to exit from the first opening S1 to the outside of the entry route S. The marker 4 returns to the initial position, which is an equilibrium position where it stops due to gravity. The marker 4 can return to the initial position although it does not have an actuator or the like for driving the marker 4.

According to the automatic guided transport system 300 of the present embodiment, the docking operation between the carriage (object to be transported) 100 and the automatic guided transport vehicle 200 can be improved. The marker 4 is arranged on the entry route S, and the automatic guided transportation vehicle 200 can easily grasp the position of the marker 4 by bringing the sensor 210 close to the marker 4.

According to the automatic guided transport system 300 of the present embodiment, although the marker 4 does not have an actuator or the like for driving the marker 4, the marker 4 can be retracted from the entry route S by coming into contact with the automatic guided transport vehicle 200 entering the entry route S. When the automatic guided transportation vehicle 200 exits from the first opening S1 to the outside of the entry route S, the marker 4 can return to the initial position even though it does not have an actuator or the like for driving the marker 4.

According to the automatic guided transportation system 300 of this embodiment, the sensor 210 of the automatic guided transportation vehicle 200 is exposed from the second opening S2 in a state where the carriage 100 is supported or semi-supported. Therefore, the automatic guided transportation vehicle 200 supporting or semi-supporting the carriage 100 can continue to use the sensor 210 to carry the carriage 100 to the target position T even in a state where a separate sensor used after docking is not provided.

Second Embodiment

The automatic guided transportation system 300B of the second embodiment includes a carriage 100B and an automatic guided transportation vehicle 200. The carriage 100B is an example of an object to be transported by the automatic guided transportation vehicle 200.

Figure 10:
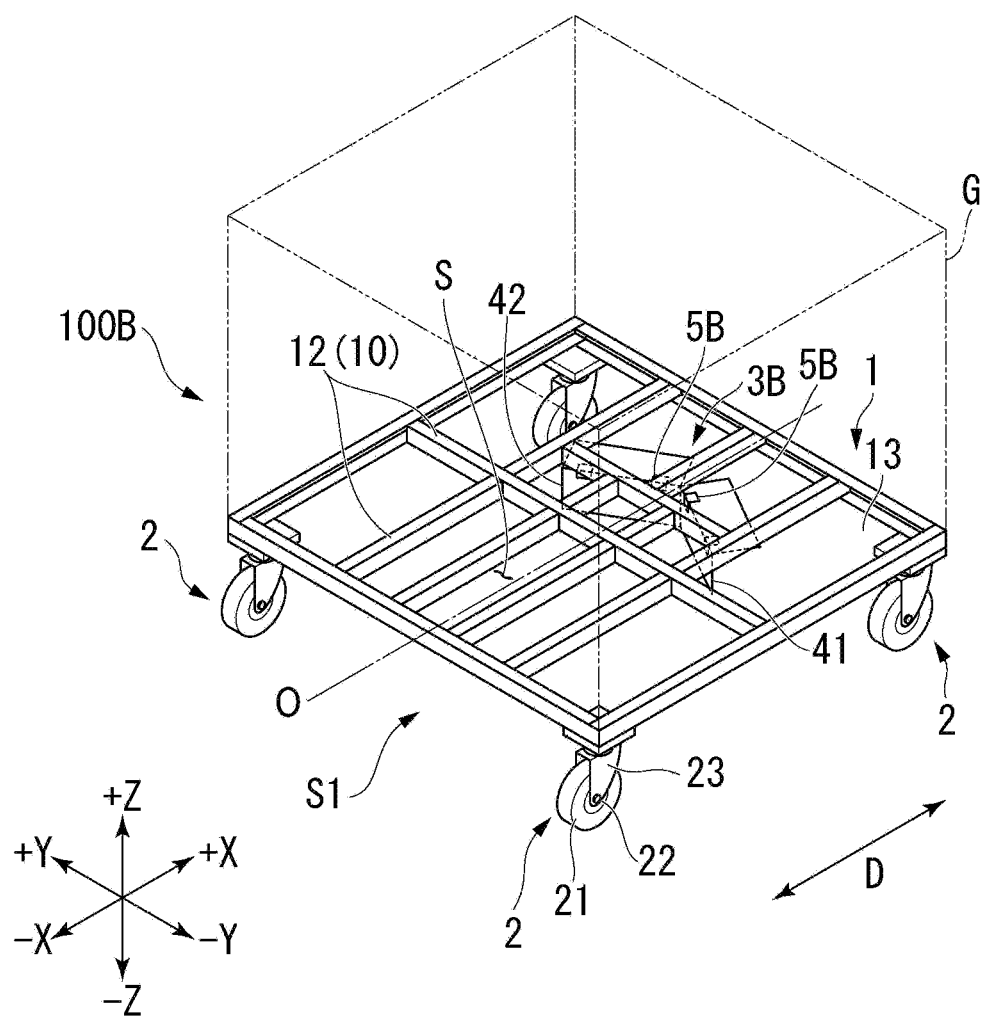
FIG. 10 is a perspective view of a carriage of the automatic guided transportation system according to the second embodiment.

FIG. 10 is a perspective view of the carriage 100B.

The carriage 100B has a housing 1, a swivel caster 2, and a movable marker 3B. As shown in FIG. 10, the carriage 100B is a vehicle that carries and transports an object to be transported G.

The movable marker 3B is a movable marker provided on the entry route S, as shown in FIG. 10. The movable marker 3B is provided on the entry route S at a position closer to the second opening S2 than the first opening S1. The movable marker 3B has a marker 4B and a marker holder 5B that holds the marker 4B.

Figure 11:
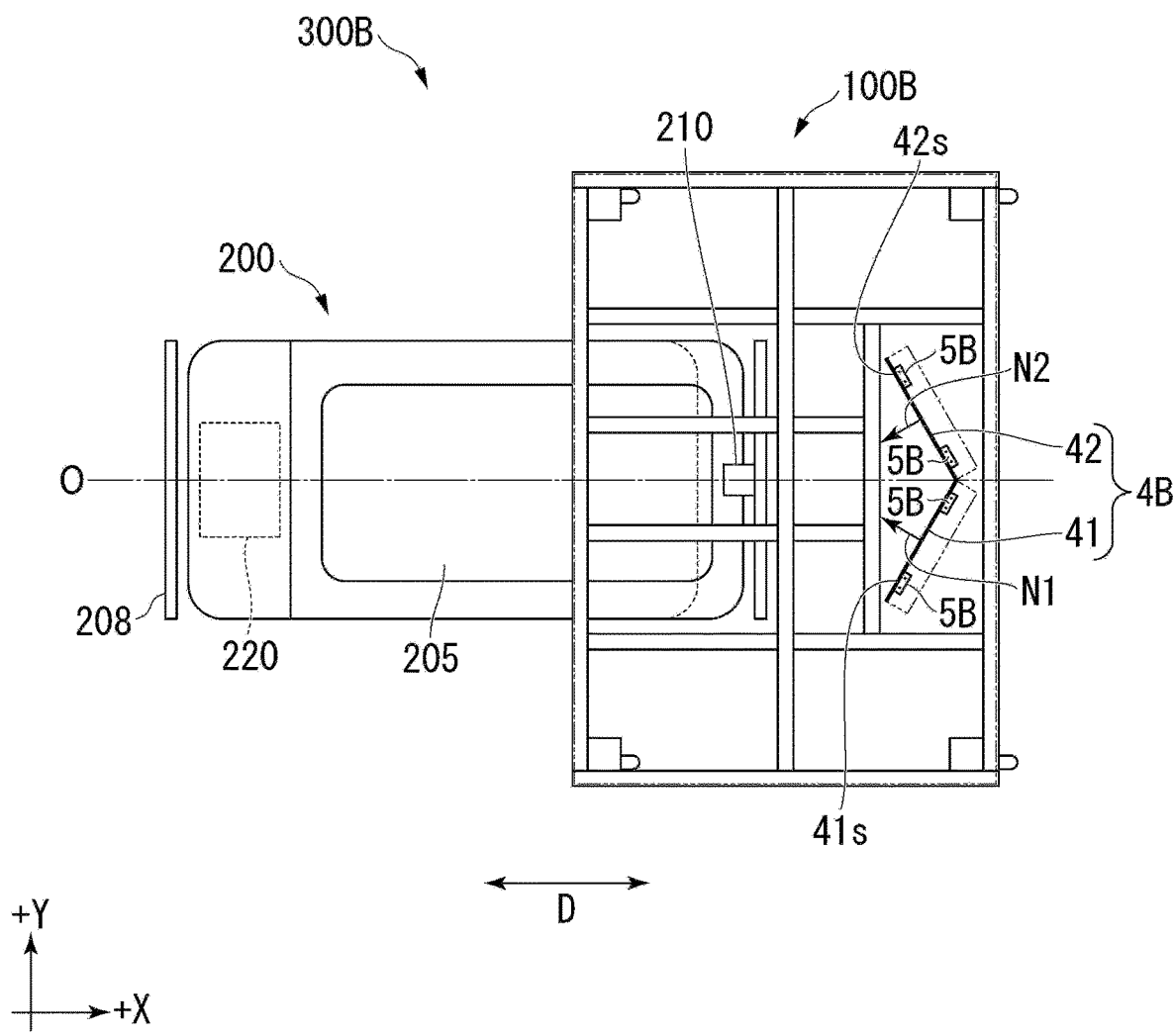
FIG. 11 is a plan view of the automatic guided transportation system.

FIG. 11 is a plan view of the automatic guided transportation system 300B.

The marker 4B has a first marker 41 and a second marker 42. The first marker 41 and the second marker 42 are the same markers as the marker 4 of the first embodiment. The first marker 41 and the second marker 42 are arranged in the left-right direction with the central axis O along the entry direction D of the entry route S interposed therebetween. Further, the first marker 41 and the second marker 42 are arranged at positions symmetrical with respect to the central axis O.

The normal direction of the first marker 41 and the second marker 42 is inclined with respect to the entry direction D of the entry route S. The normal line N1 of the surface 41s of the first marker 41 that faces the automatic guided transportation vehicle 200 faces the central axis O side with respect to the entry direction D. The normal line N2 of the surface 42s of the second marker 42 that faces the automatic guided transportation vehicle 200 faces the central axis O side with respect to the entry direction D. As shown in FIG. 11, the angle formed by the surface 41s of the first marker 41 and the surface 42s of the second marker 42 is smaller than 180 degrees in plan view and is preferably 110 to 140 degrees.

The marker holder 5B holds the first marker 41 and the second marker 42 on the entry route S, similarly to the marker holder 5 of the first embodiment. The marker holder 5B holds the first marker 41 and the second marker 42 independently of each other.

According to the automatic guided transportation system 300B of the present embodiment, the automatic guided transportation vehicle 200 uses the two markers, the first marker 41 and the second marker 42, to acquire the relative distance to the marker 4B and the direction of the marker 4 more accurately by the sensor 210. The normal N1 of the surface of the first marker 41 and the normal N2 of the surface of the second marker 42, which face the automatic guided transportation vehicle 200, face the central axis O side with respect to the entry direction D. Thereby, the automatic guided transportation vehicle 200 can easily recognize the central axis O of the entry route S and can enter a more accurate position on the entry route S.

In each of the above-described embodiments, the marker 4 and the like are retracted from the entry route S by rotating the lower end of the marker in the front-back direction. The markers 4 and the like may be retracted from the entry route S by rotating the ends in a left-right direction.

Figure 12:
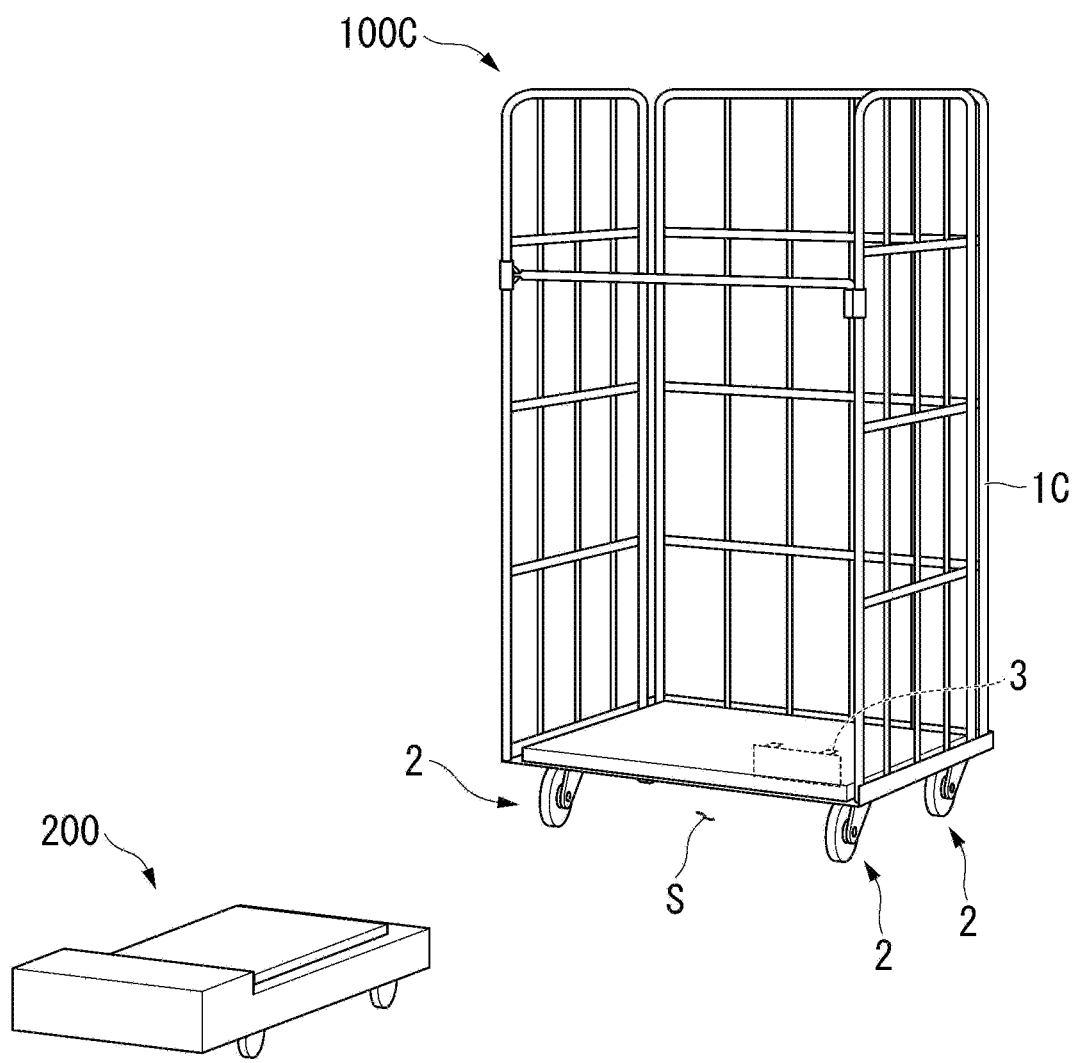
FIG. 12 is a perspective view showing a basket carriage which is another example of the object to be transported.

In each of the above-described embodiments, the carriage 100 and the carriage 100B are described as the object to be transported, but the object to be transported are not limited thereto. FIG. 12 is a perspective view showing a basket carriage 100C that is another example of the object to be transported. The basket carriage 100C includes a cage-shaped casing 1C, a flexible caster 2, and a movable marker 3. The movable marker 3 is provided on the entry route S of the automatic guided transportation vehicle 200 in the housing 1C.

According to at least one embodiment described above, by having the movable marker 3 or 3B, the docking operation between the object to be transported 100 and the automatic guided transportation vehicle 200 can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An object to be transported by an automatic guided transportation vehicle, comprising:
   a housing having an entry route through which the automatic guided transportation vehicle enters;
   a marker that can be recognized by a sensor provided in the automatic guided transportation vehicle; and
   a marker holder configured to hold the marker at an initial position where the marker contacts with the automatic guided transportation vehicle in the entry route, the marker holder being configured to retract the marker from the entry route.

2. The object to be transported according to claim 1, wherein
   the marker holder is configured to hold the marker rotatably, and
   the marker is configured to be retracted from the entry route by rotating in contact with the automatic guided transportation vehicle.

3. The object to be transported according to claim 2, wherein
   the initial position is an equilibrium position where the marker is stopped by gravity, and
   the marker returns to the initial position when the automatic guided transportation vehicle exits from the entry route.

4. The object to be transported according to claim 1, wherein the marker is formed in a plate shape.

5. The object to be transported according to claim 4, wherein
   the marker has a first marker and a second marker separated with each other, and
   the first marker and the second marker are arranged in a left-right direction perpendicular to an entry direction in which the automatic guided transportation vehicle enters in the entry route.

6. The object to be transported according to claim 5, wherein
the first marker and the second marker are arranged in the left-right direction with a central axis along the entry direction of the entry route interposed therebetween,
the first marker and the second marker are arranged at positions symmetrical with respect to the central axis,
the first marker has a first plate surface,
the second marker has a second plate surface, and
an angle formed by the first plate surface and the second plate surface is smaller than 180 degrees.

7. The object to be transported according to claim 1, wherein the entry route of the housing is formed below the bottom surface of the housing.

8. An automatic guided transportation system comprising:
the object to be transported according to claim 1; and
the automatic guided transportation vehicle.

9. The automatic guided transportation system according to claim 8, wherein the sensor of the automatic guided transportation vehicle is a laser range sensor.

10. The automatic guided transportation system according to claim 8, wherein the sensor of the automatic guided transportation vehicle is a camera.

11. The automatic guided transportation system according to claim 8, wherein the object to be transported is a carriage having wheels.

12. The automatic guided transportation vehicle system according to claim 8, wherein
the entry route has a first opening into which the automatic guided transportation vehicle enters, and a second opening on a side opposite to the first opening in an entry direction in which the automatic guided transportation vehicle enters,
the automatic guided transportation vehicle has a sensor at a distal end in the entry direction, and
the sensor of the automatic guided transportation vehicle that has entered the entry route is exposed from the second opening.

* * * * *